(12) United States Patent
Wu et al.

(10) Patent No.: US 12,216,856 B2
(45) Date of Patent: Feb. 4, 2025

(54) FLOATING IMAGE DISPLAY DEVICE AND ASSEMBLABLE FLOATING IMAGE DISPLAY ARRAY

(71) Applicant: INDUSTRIAL TECHNOLOGY RESEARCH INSTITUTE, Hsinchu (TW)

(72) Inventors: Szu-Wei Wu, Taoyuan (TW); Yi-Hsiang Huang, Changhua (TW); Hung Tsou, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 18/368,354

(22) Filed: Sep. 14, 2023

(65) Prior Publication Data

US 2024/0411400 A1     Dec. 12, 2024

(30) Foreign Application Priority Data

Jun. 7, 2023 (TW) ................................. 112121162

(51) Int. Cl.
  *G06F 3/041*     (2006.01)
  *G02B 30/56*    (2020.01)
  (Continued)

(52) U.S. Cl.
  CPC ......... *G06F 3/04164* (2019.05); *G02B 30/56* (2020.01); *H04N 13/32* (2018.05); *H04N 13/366* (2018.05); *G06F 2203/04108* (2013.01)

(58) Field of Classification Search
  CPC ...... G06F 3/04164; G06F 2203/04108; H04N 13/32; G02B 30/56
  See application file for complete search history.

(56) References Cited

U.S. PATENT DOCUMENTS 10,488,584 B2    11/2019    Karafin
2021/0342031 A1*  11/2021    Huang ................... G06F 3/043
(Continued)

FOREIGN PATENT DOCUMENTS

CN    104749787 A    10/2017
CN    111522146 B    2/2021
(Continued)

OTHER PUBLICATIONS

TW Office Action dated Apr. 3, 2024 as received in Application No. 112121162.

*Primary Examiner* — Robert J Michaud
(74) *Attorney, Agent, or Firm* — Maschoff Brennan

(57) ABSTRACT

A floating image display device comprises a floating image display module and a signal processing module. The floating image display module has a first upper assembling surface and a first lower assembling surface, and comprises a first pin located on the first lower assembling surface. The floating image display module is configured to form a floating image. The signal processing module has a second upper assembling surface and a second lower assembling surface, and comprises a plurality of second pins located on the second upper assembling surface. One of the plurality of second pins is detachably connected to the first pin. The signal processing module is configured to identify the floating image display module according to the position of the first pin corresponding to the plurality of second pins, and transmit a display signal associated with the floating image to the floating image display module through the first pin.

20 Claims, 16 Drawing Sheets

(51) Int. Cl.
*H04N 13/32* (2018.01)
*H04N 13/366* (2018.01)

(56) References Cited

U.S. PATENT DOCUMENTS

2022/0214560 A1* 7/2022 Yang ................. G02B 27/0093
2022/0326760 A1   10/2022 Karafin

FOREIGN PATENT DOCUMENTS

| TW | M617636 U  | 10/2021 |
| TW | 202142926 A | 11/2021 |
| TW | I770949 B  | 7/2022  |
| TW | 202243302 A | 11/2022 |

* cited by examiner

FLOATING IMAGE DISPLAY DEVICE AND ASSEMBLABLE FLOATING IMAGE DISPLAY ARRAY

CROSS-REFERENCE TO RELATED APPLICATIONS

This non-provisional application claims priority under 35 U.S.C. § 119 (a) on Patent Application No(s). 112121162 filed in ROC on Jun. 7, 2023, the entire contents of which are hereby incorporated by reference.

BACKGROUND

1. Technical Field

This disclosure relates to a floating image display device and assemblable floating image display array.

2. Related Art

Human machine interface (HMI) is an interface for users to interact with devices. Among them, non-contact interfaces, such as floating three-dimensional display buttons, allow users to interact with the device without directly touching the surface of the device.

In various fields, such as elevator buttons, ATM keypads, car consoles, medical instruments, etc., due to different environmental constraints and field requirements, there may be different functional requirements for floating image display device. However, the current general floating button modules cannot be broadly used in various fields, which causes inconvenience in application.

SUMMARY

According to one or more embodiment of this disclosure, a floating image display device comprises a floating image display module and a signal processing module. The floating image display module has a first upper assembling surface and a first lower assembling surface oppositely disposed, and comprises a first pin located on the first lower assembling surface. The floating image display module is configured to form floating images. The signal processing module has a second upper assembling surface and a second lower assembling surface oppositely disposed, and comprises a plurality of second pins located on the second upper assembling surface, wherein one of the plurality of second pins is detachably connected to the first pin. The signal processing module is configured to identify the floating image display module according to the position of the first pin corresponding to the plurality of second pins, and transmit the display signal associated with the floating image to the floating image display module through the first pin.

According to one or more embodiment of this disclosure, an assemblable floating image display array comprises a plurality of floating image display devices. Each of the plurality of floating image display devices comprises a floating image display module and a signal processing module. The floating image display module has a first upper assembling surface and a first lower assembling surface oppositely disposed, and comprises a first pin located on the first lower assembling surface. The floating image display module is configured to form floating images. The signal processing module has a second upper assembling surface and a second lower assembling surface oppositely disposed, and a lateral assembling surface, and comprises a plurality of second pins located on the second upper assembling surface and at least one lateral pin located on the lateral assembling surface, wherein one of the plurality of second pins is detachably connected to the first pin. The signal processing module is configured to identify the floating image display module according to the position of the first pin corresponding to the plurality of second pins, and transmit the display signal associated with the floating image to the floating image display module through the first pin. Each of the plurality of floating image display devices is laterally connected to each other through the at least one lateral pin.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous details are set forth in order to provide a thorough understanding of the disclosed embodiments. According to the description, claims and the drawings disclosed in the specification, one skilled in the art may understand the concepts and features of the present disclosure. The following embodiments further illustrate various aspects of the present disclosure, but are not meant to limit the scope of the present disclosure.

When a light source emits light on an object, the observer can observe the object through the reflected light reflected by the object. For the observer, the reflected light of the object has position, angle and intensity information, which can be described by the plenoptic function $P(x, y, z, \theta, \varphi, \lambda, t)$. "x, y, and z" are the 3D space coordinates of the observer with respect to the object, "$\theta$ and $\varphi$" respectively represent the polar angle and azimuth angle in spherical coordinates of the observer with respect to the object, "$\lambda$" represents the wavelength of the reflected light, and "t" represents the time when the observer receives the reflected light.

By simulating and restoring the characteristics and propagation direction of the reflected light entering the observer's eyes, for example, through the combination of the light field imaging sheet and the lens inside the floating image display module, the plenoptic function $P(x, y, z, \theta, \varphi, \lambda, t)$ can be reconstructed optically, that is, the propagation direction and intensity, etc. of light can be reconstructed. A 3D image of a virtual object is reconstructed in space, so that observers can observe the reconstructed virtual image from different angles with the same visual effect as observing the real object.

Figure 1:
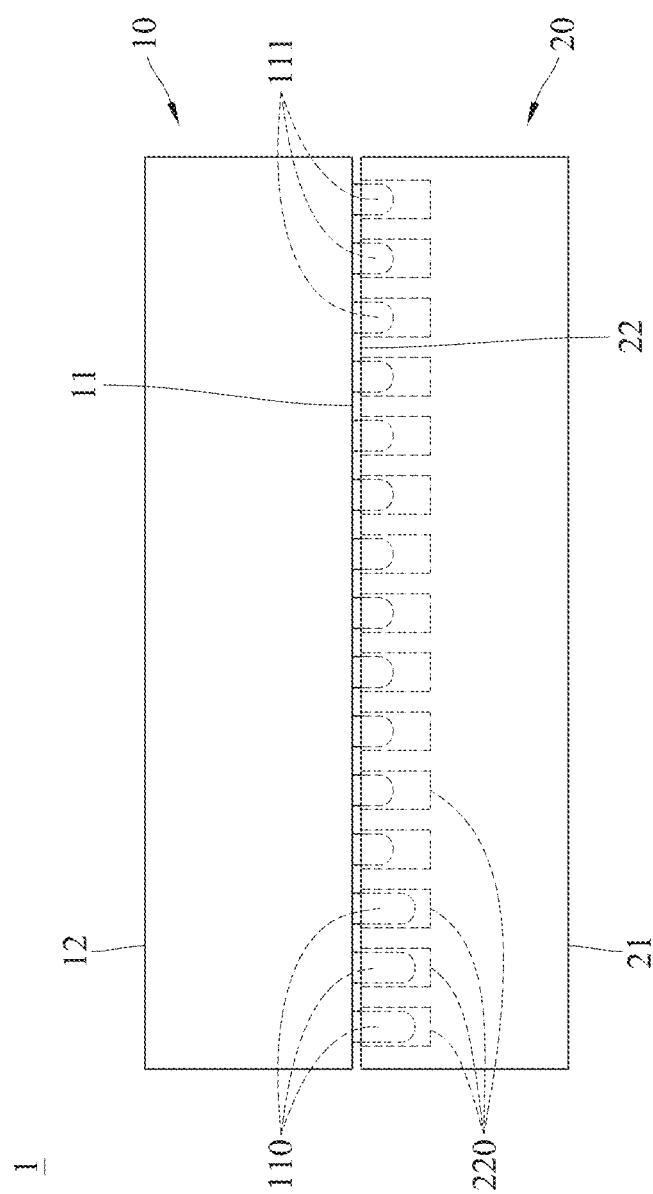
FIG. 1 schematically illustrates a lateral structure of a floating image display device according to an embodiment of the present disclosure.

Please refer to FIG. 1 which schematically illustrates a lateral structure of a floating image display device according to an embodiment of the present disclosure. As shown in FIG. 1, a floating image display device 1 comprises a floating image display module 10 and a signal processing module 20. The floating image display module 10 has a first lower assembling surface 11 and a first upper assembling surface 12 oppositely disposed, and comprises a first pin 110 and connection pins 111 located on the first lower assembling surface 11. The floating image display module 10 is configured to form floating images. The signal processing module 20 has a second lower assembling surface 21 and a second upper assembling surface 22 oppositely disposed, and comprises a plurality of second pins 220 located on the second upper assembling surface 22, wherein one of the plurality of second pins 220 is detachably connected to the first pin 110. The signal processing module is configured to identify the floating image display module 10 according to the position of the first pin 110 corresponding to the plurality of second pins 220, and transmit the display signal associated with the floating image to the floating image display module 10 through the first pin 110. In the floating image display module 10, the connection pins 111 are configured to be detachably connected/combined to the second pins 220, and the connection pins 111 are optionally disposed.

It should be noted that although the number of the first pin 110 mentioned above is singular, as those skilled in the art can understand, a set of pins can include multiple pins, so the number of pins described herein can also be referred to as the number of sets of pins. For example, as shown in FIG. 1, a set of pins (the first pin 110) may have three pins.

In the embodiment, the floating image display module 10 can be implemented with reference to the optical imaging module in the Republic of China Patent Application No. 110114269. The floating image display module 10 is configured to generate floating images. The following describes the working principle of the floating image display module 10 by way of example but not limitation. The floating image display module 10 may include, for example, a light source, an optical filter, and an optical modulator. When the light generated by the light source passes through the optical filter and the optical modulator, the plenoptic function of the light reflected by the object can be reconstructed to reproduce the 3D image.

The light source of the floating image display module 10 is configured to generate light. In some embodiments, the light may be parallel or may be non-parallel in other embodiments. The floating image display module 10 may include a lens, such as a Fresnel lens, disposed in front of the light source, so that the non-parallel light emitted by the light source can be adjusted into parallel light. The light source may be a light emitting diode (LED), a quantum dot, an organic light emitting diode (OLED) or the like.

The light generated by the light source of the floating image display module 10 passes through the optical filter. The optical filter is configured to pattern the light and optimize the optical field shape to form a light field image. In some embodiments, the optical filter may be, for example, a high-resolution integrated imaging sheet. Taking an imaging sheet of a transparent material as an example, the patterned light is generated from the light source through the imaging sheet, and then passes through the lens to create a 3D optical image. By optimizing the collimation of the light source, the light is close to parallel light, which is conducive to clearer 3D images. Or, taking the display as an imaging sheet as an example, the thickness of the display package can be reduced to reduce the path length of the light propagating through the film layer and to improve the flexibility of the optical design. In some embodiments, the material of the imaging sheet can be glass, plastic or other transparent materials. The pattern, structure, or thickness/shape of some regions of the optical filter can also be changed to achieve the above-mentioned effect of optimizing optical field shape effect and improve imaging quality.

After passing through the optical filter of the floating image display module 10, the light passes through the optical modulator. Optical modulator can be used to focus light to create floating images. In some embodiments, the imaging height of the floating image can be changed by adjusting the position of the optical modulator. In some embodiments, the optical modulator may be, for example, a lens array, a lenticular lens, an optical fiber, a grating or a photonic crystal, but is not limited thereto. In some embodiments, an additional lens, such as a single lens or a lens group, may be disposed between the optical modulator and the floating image. Lenses can concentrate light, make images clearer or increase the field of view (FOV) or viewing angle.

As shown in FIG. 1, the signal processing module 20 is electrically connected to the floating image display module 10 through the first pin 110. The signal processing module 20 can transmit the display signal related to the image information of the floating image to the floating image display module 10 through the first pin 110. The floating image display module 10 can generate the floating image according to the display signal. In some embodiments, the signal processing module 20 may include elements with signal processing functions, such as central processing unit, microcontroller, programmable logic controller, etc., for generating the display signals mentioned above. In some embodiments, the signal processing module 20 may include a power supply unit for providing power required by the floating image display module 10 connected thereto.

In the present embodiment, the second upper assembling surface 22 of the signal processing module 20 is connected to the first lower assembling surface 11 of the floating image display module 10, and the second pins 220 of the signal processing module 20 are detachably connected to the first pin 110 and the connection pins 111 of the floating image display module 10. The signal processing module 20 can identify the floating image display module 110 according to the position of the first pin 110 of the floating image display module 10 corresponding to the second pins 220, and transmit the corresponding display signal to the floating image display module 10 through the first pin 110. The signal processing module 20 can be connected with different floating image display modules, and the signal processing module 20 can identify the floating image display modules according to the position of the first pin, and transmit corresponding display signal to each floating image display module to generate the corresponding floating image. Through the detachable floating image display module 10 and the signal processing module 20, various floating image display devices 1 can be flexibly configured to meet the requirements of various fields.

Figure 2A:
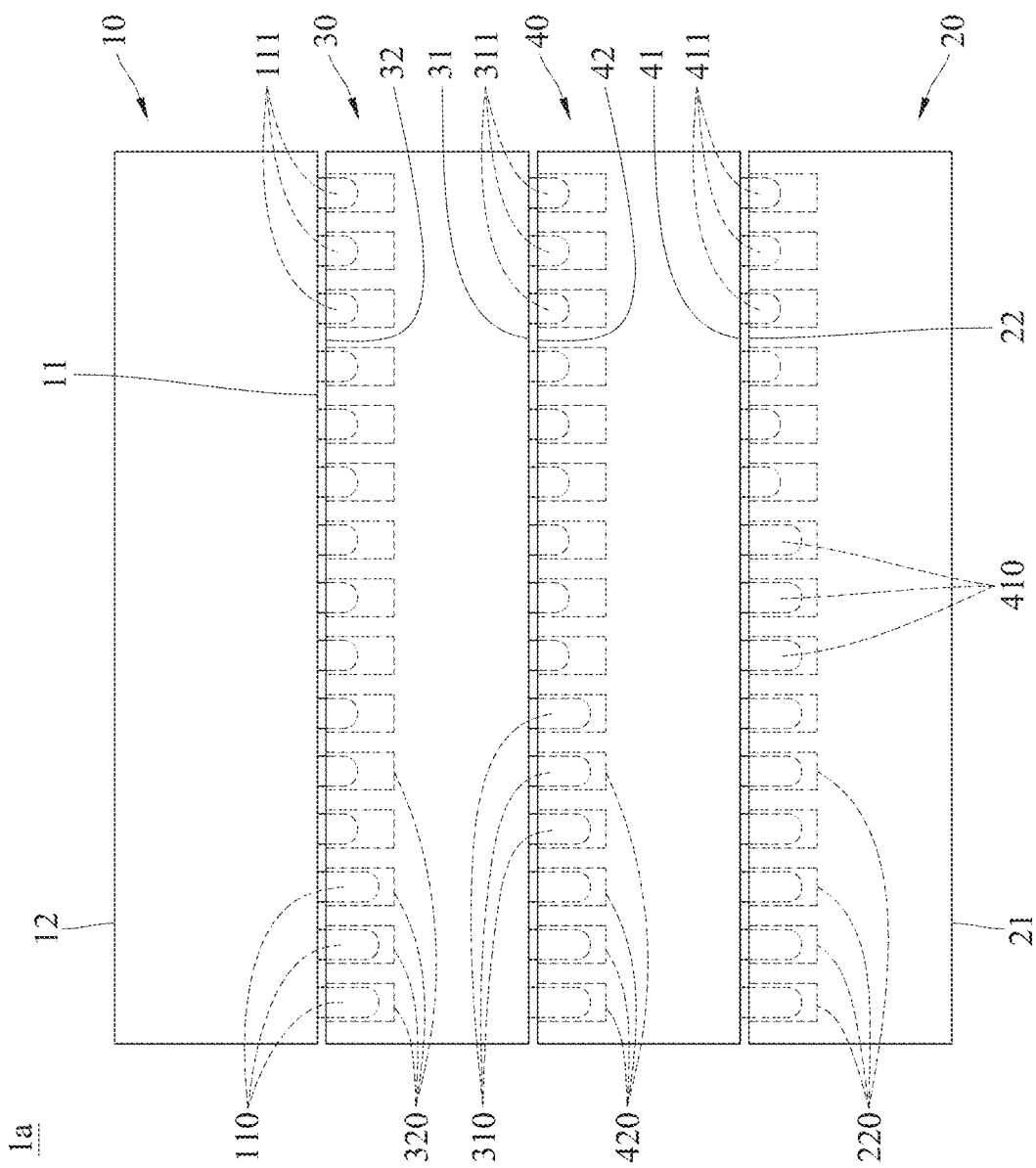
FIGS. 2A to 2C schematically illustrate a lateral structure of a floating image display device according to another embodiment of the present disclosure.
Figure 2B:
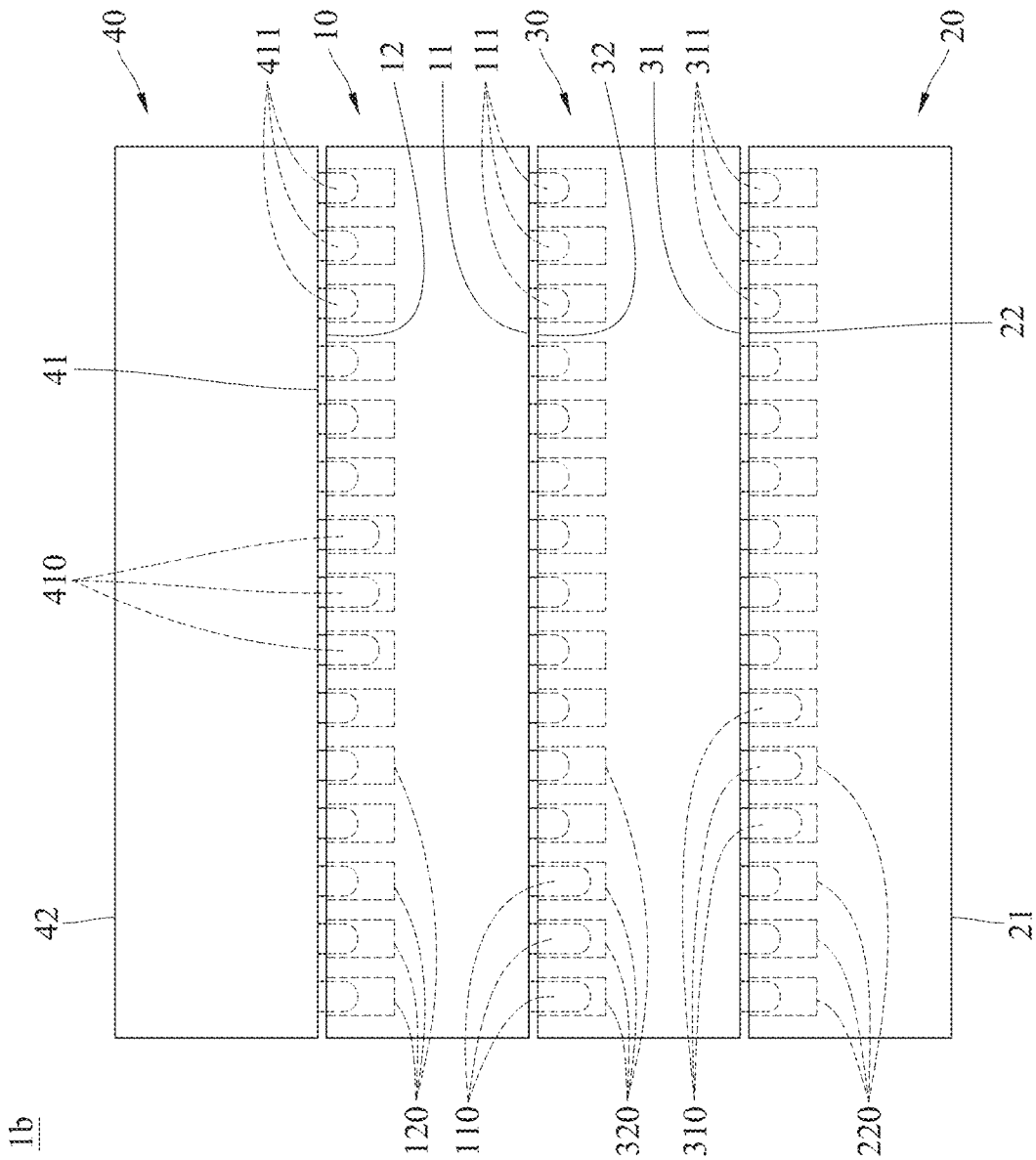
Figure 2C:
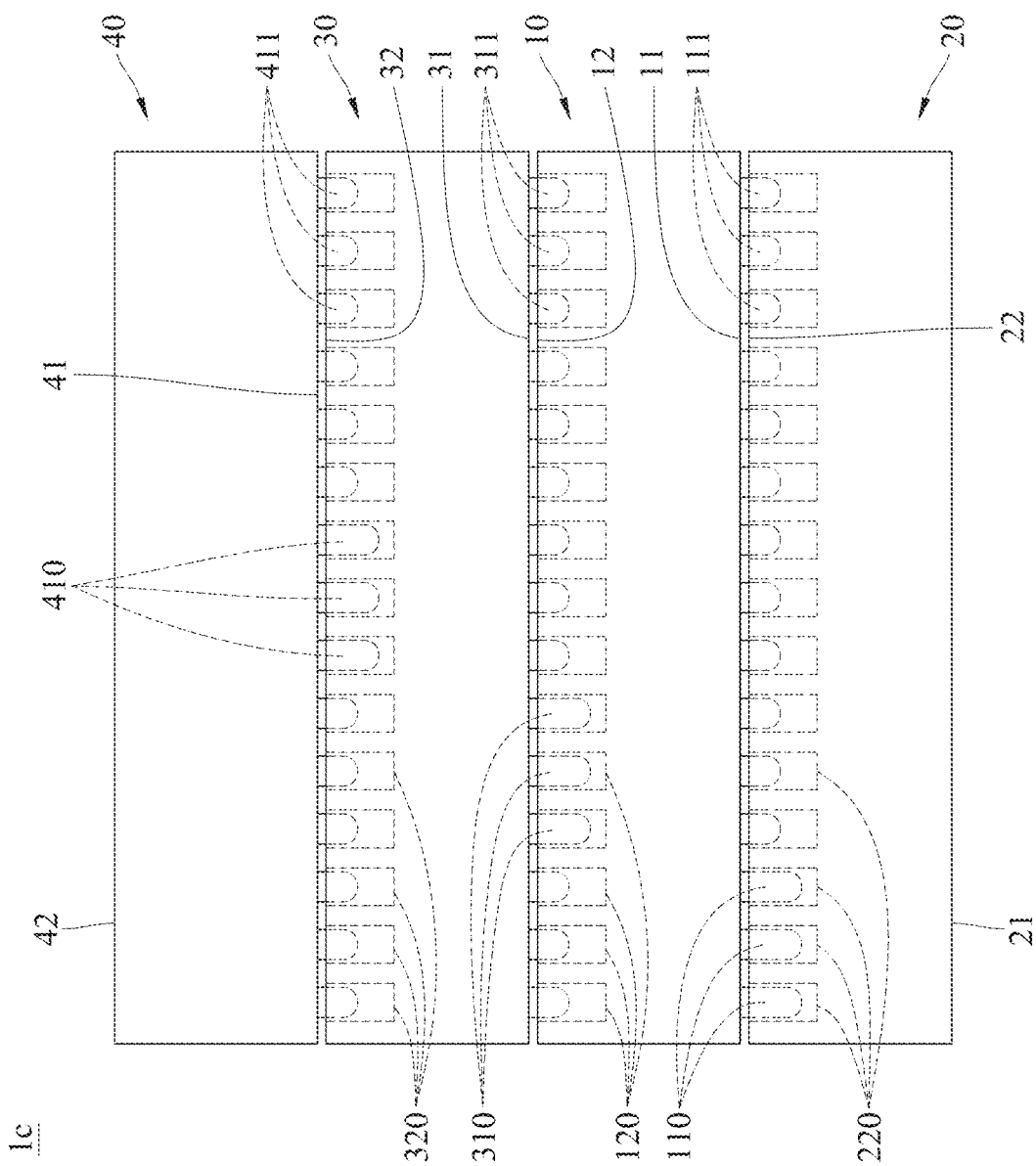

Please refer to FIGS. 2A to 2C, which schematically illustrate a lateral structure of a floating image display device according to another embodiment of the present disclosure. As shown in FIGS. 2A to 2C, the floating image display device 1a may include a floating image display module 10, a signal processing module 20, a sensing module 30 and a feedback module 40. The floating image display module 10 has a first lower assembling surface 11 and a first upper assembling surface 12 oppositely disposed, and includes a first pin 110 and connection pins 111 located on the first lower assembling surface 11. As shown in FIGS. 2B to 2C, in some implementations, the floating image display module 10 may optionally include a plurality of third pins 120 located on the first upper assembling surface 12, wherein the third pins 120 respectively correspond to the second pins 220. The signal processing module 20 has a second lower assembling surface 21 and a second upper assembling surface 22 oppositely disposed, and includes a plurality of second pins 220 located on the second upper assembling surface 22. In some implementations, the signal processing module 20 can be disposed on a stringing motherboard (not shown) through the second lower assembling surface 21. The sensing module 30 has a third lower assembling surface 31 and a third upper assembling surface 32 oppositely disposed, and includes a fourth pin 310 and connection pins 311 located on the third lower assembling surface 31. As shown in FIGS. 2A to 2C, in some implementations, the sensing module 30 may optionally include a plurality of fifth pins 320 located on the third upper assembling surface 32, wherein the fifth pins 320 respectively correspond to the second pins 220. The feedback module 40 has a fourth lower assembling surface 41 and a fourth upper assembling surface 42 oppositely disposed, and includes a sixth pin 410 and connection pins 411 located on the fourth lower assembling surface 41. As shown in FIG. 2A, in some embodiments, the feedback module 40 may optionally include a plurality of seventh pins 420 located on the fourth upper assembling surface 42, wherein the seventh pins 420 respectively correspond to the second pins 220.

Figure 3A:
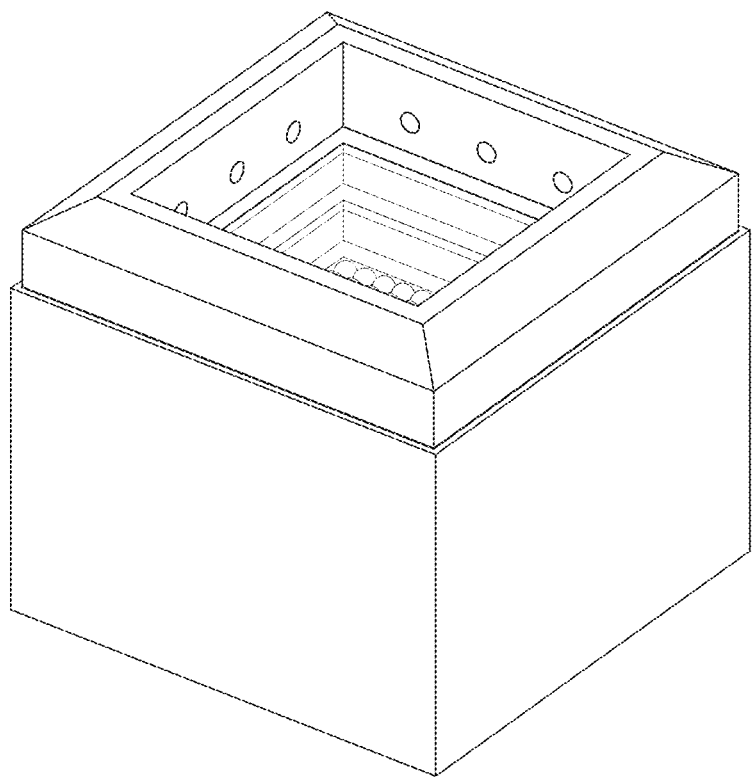
FIG. 3A schematically illustrates a 3D structure of a floating image display device according to still another embodiment of the present disclosure.
Figure 3B:
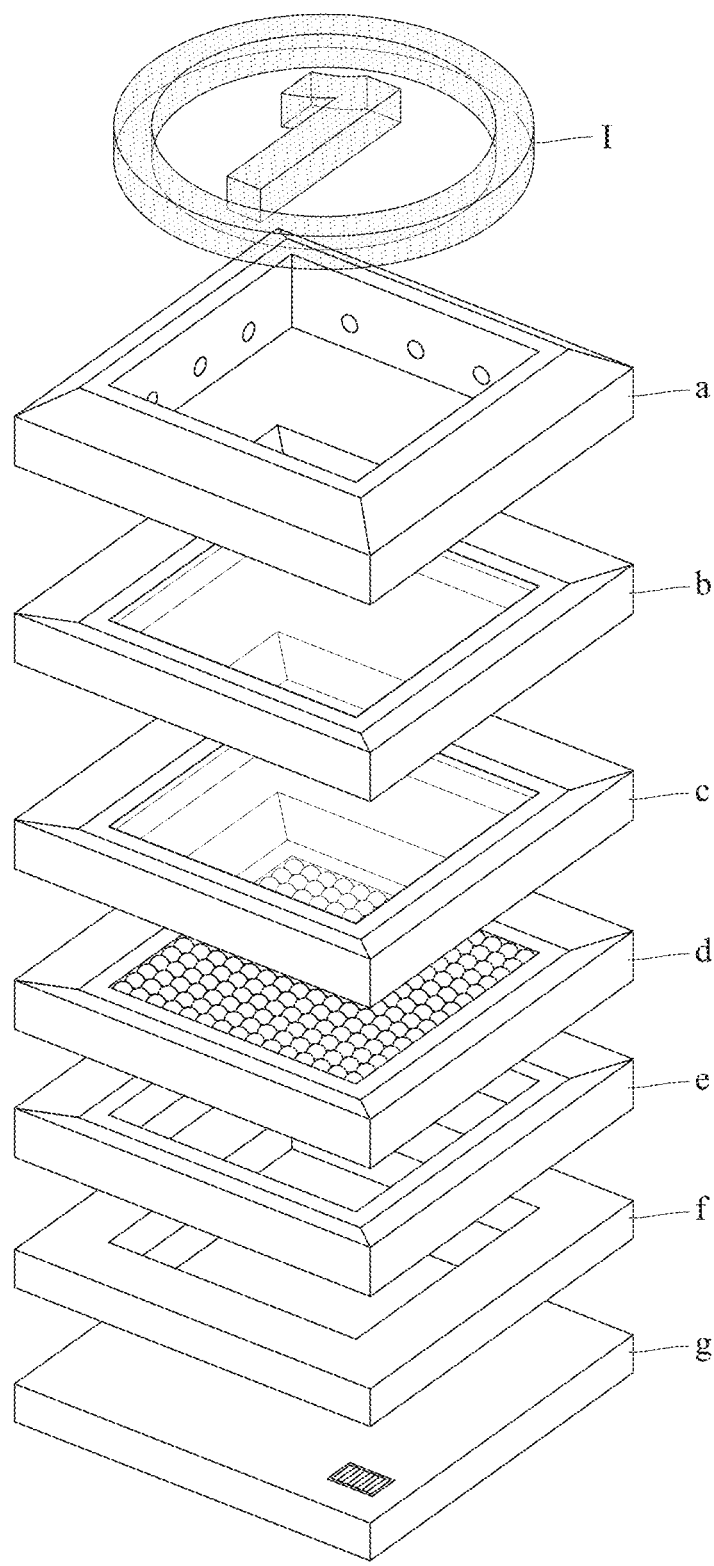
FIG. 3B is an explosive diagram of the floating image display device according to FIG. 3A.

Please refer to FIGS. 3A and 3B. FIG. 3A schematically illustrates a 3D structure of a floating image display device according to still another embodiment of the present disclosure, and FIG. 3B is an explosive diagram of the floating image display device according to FIG. 3A. As shown in FIGS. 3A and 3B, the floating image display device 1' for generating the floating image I may include, for example, a plurality of modules a to g, wherein the modules a to g may include the floating image display module 10, the signal processing module 20, the sensing module 30 and the feedback module 40 mentioned above, and other functional modules. For example, functional modules may include power supply modules or other signal processing modules, or may also include floating lens modules or other optical imaging modules, or include other sensing modules (such as magnetic field sensing, optical sensing, temperature sensing, etc.) and other feedback modules (such as airflow feedback, sound feedback, etc.), and the present disclosure is not limited thereto.

By assembling modules with different functions, a floating image display device meeting the requirements of a specific field can be produced, and the modules with different functions are not limited to be connected in a specific way. Taking the floating image display module 1a shown in FIG. 2A as an example, from top to bottom, the floating image display module 10 is connected to the sensing module 30 through the first pin 110; the sensing module 30 is connected to the feedback module 40 through the fourth pin 310; and the feedback module 40 is connected to the signal processing module 20 through the sixth pin 410. The signal processing module 20 identifies the floating image display module 10 according to the position of the first pin 110 with respect to the second pins 220; identifies the sensing module 30 according to the position of the fourth pin 310 with respect to the second pins 220; and identifies the feedback module 40 according to the position of the sixth pin 410 with respect to the second pins 220. Through this configuration, the signal processing module 20 can identify all the functional modules connected to it, and transmit the signals required by the functional pins through the corresponding pins. In the present embodiment, the floating image display module 10, the signal processing module 20, the sensing module 30 and the feedback module 40 can each include element with calculation and determination functions, such as central processing unit, microcontroller, programmable logic controller, or the like.

For example, when the floating image display module 10 is connected to the sensing module 30, the sensing module 30 can obtain the position of the first pin 110 corresponding to the second pins 220 according to the position of the first pin 110 with respect to the fifth pins 320, so as to obtain identification data (1, 0, 0). When the sensing module 30 is connected to the feedback module 40, the feedback module 40 can obtain the position of the fourth pin 310 corresponding to the second pins 220 according to the position of the fourth pin 310 with respect to the seventh pins 420, and then combine the identification data above to obtain identification data (1, 1, 0). When the feedback module 40 is connected to the signal processing module 20, the signal processing module 20 can obtain identification data (1, 1, 1) according to the position of the sixth pin 410 with respect to the second pins 220 and the above identification data. When the signal processing module 20 obtains the identification data (1, 1, 1), it can transmit the signals required by the floating image display module 10, the sensing module 30 and the feedback module 40 to the feedback module 40 through the sixth pin 410. When the feedback module 40 receives the signal, it can transmit the signals required by the floating image display module 10 and the sensing module 30 to the sensing module 30 through the fourth pin 310. When the sensing module 30 receives the signal, it can transmit the signal required by the floating image display module 10 to the floating image display module 10 through the first pin 110. In another implementation, when the two modules are connected in an upper-lower manner, the pins of the upper module can drive the corresponding pins of the lower module, so that the pins of the lower module can directly reflect all the modules above it. Taking FIG. 2A as an example, the first pin 110 of the uppermost floating image display module 10 can trigger the connection pins 311 of the corresponding position of the sensing module 30 on the next layer, and further trigger the connection pins 411 of the corresponding position of the feedback module 40 on the next layer, so that the signal processing module 20 can transmit the signal required by the floating image display module 10 through the second pins 220.

It should be noted that various modules are not limited to be assembled and connected in a specific order. Taking the floating image display module 1b shown in FIG. 2B as an example, the connection relationship from top to bottom is: the feedback module 40, the floating image display module 10, the sensing module 30 and the signal processing module 20. Taking the floating image display module 1c shown in FIG. 2C as an example, the connection relationship from top to bottom is: the feedback module 40, the sensing module 30, the floating image display module 10 and the signal processing module 20. It should be noted that various functional modules can be optionally disposed. For example, for the requirements of simple display, The floating image display module 10 and the signal processing module 20 may be configured. For requirements of sensing user touch control, an additional sensing module 30 may be configured. For requirements of providing user touch control feedback, an additional feedback module 40 may be configured. And various possible connection and configuration relationships are not described herein.

The sensing module 30 can be used to define the contour range of the floating image, sense the testing object entering the contour range of the floating image, and provide the position information of the testing object. The sensing module 30 is configured to sense whether there is a testing object within the range corresponding to the floating image and generating a sensing signal. In some embodiments, the detection signal sent by the sensing module 30 may be, for example, an invisible light signal, an ultrasonic signal or other signals that do not interfere with the imaging light. In some embodiments, the sensing module 30 may include the same type of transmitter and receiver. In the present embodiment, the signal processing module 20 can be further configured to receive the sensing signal through the fourth pin 310, and update the display signal transmitted to the floating image display module 10 when the sensing signal indicates that there is a testing object within the range. The sensing module 30 may define the outline of the first floating image as a first detection boundary, and define the outline of the second floating image as a second detection boundary. Taking the floating image display device used as the floating image button as an example, the initial state of the floating image button can be set to be presented as a first floating image. When the user touches the first detection boundary of the first floating image, the sensing module 30 begins to send the first sensing signal to the signal processing module 20, and the signal processing module 20 has not updated the display signal yet. When the user touches the second detection boundary of the second floating image (such as pressing the floating image button to a certain depth), the sensing module 30 begins to send the second sensing signal to the signal processing module 20, and the signal processing module 20 updates the display signal and sends it to the floating image display module 10, so that the floating image display module 10 updates the floating image accordingly. When the user observes the change in the image of the floating image button that he presses, he knows that the touch control operation of the floating image button has been triggered.

When the signal processing module 20 obtains the sensing signal, it can generate a feedback signal and send it to the feedback module 40. The feedback module 40 can generate, for example, airflow according to the feedback signal to provide tactile feedback to the testing object. The feedback module 40 can include a gas supply sub-module, and the gas supply sub-module can have a gas supply structure (such as a gas supply pipeline, a gas supply hole, etc.), and is connected to an external gas supply source through a pipeline or has a gas supply source itself. The source can be matched with one or more pumps to inject the gas toward the outlet of the gas supply pipeline or/and the gas supply hole. In some embodiments, when an object enters the range of the floating image, the airflow tactile feedback formed by the feedback module 40 can be felt, and the sensing module 30 also detects the changing position of the object. The signal processing module 20 can determine whether to update the display signal and/or trigger the feedback signal according to the sensing signal. If the determination result is yes, the floating image can display different shapes, colors, image patterns, heights, sizes, brightness and/or with sound signals, etc., so that users can have tactile, visual and/or auditory feedback. The feedback signal may include a light feedback signal and/or an audio feedback signal, wherein the light feedback signal is provided to the floating image display module 10 to update the shape, color, pattern, height, size, etc. of the floating image, and the sound feedback signal can be used to trigger the sound sub-module (such as a speaker) to make sound. If the determination result is no, then no feedback signal will be generated, and the position of the object can be determined again.

Figure 4:
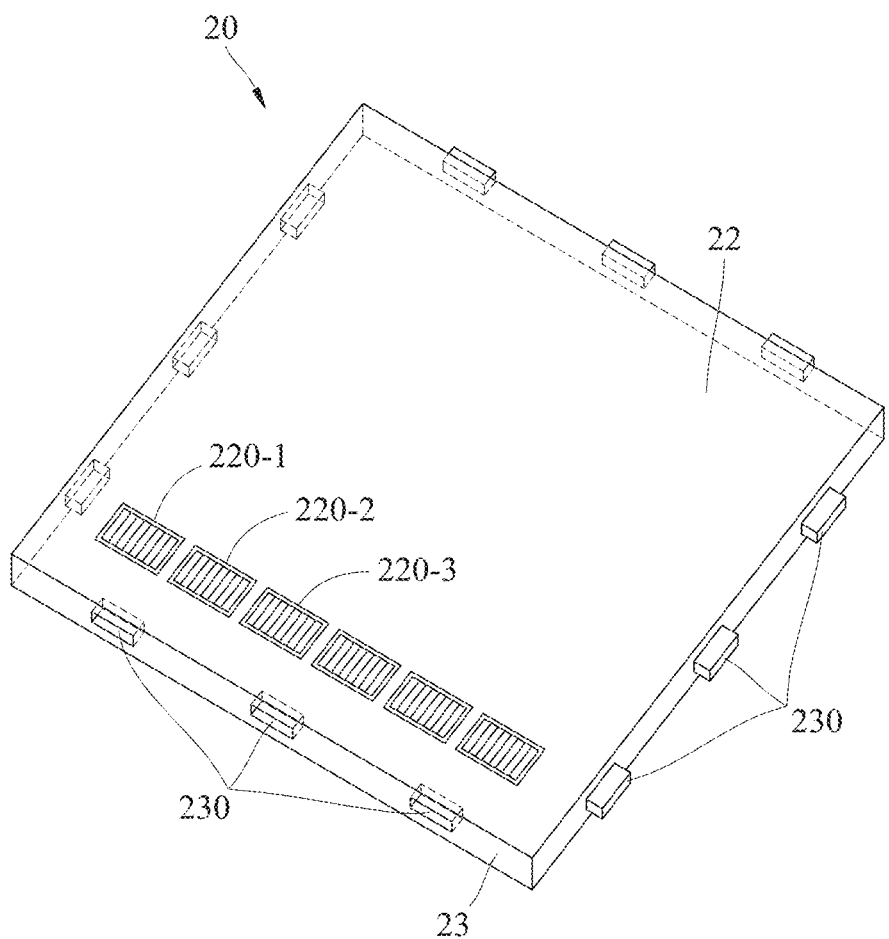
FIG. 4 schematically illustrates a signal processing module of a floating image display device according to an embodiment of the present disclosure.

Please refer to FIG. 4, which schematically illustrates a signal processing module of a floating image display device according to an embodiment of the present disclosure. As shown in FIG. 4, the second upper assembling surface 22 of the signal processing module 20 can be provided with a plurality of second pins 220-1, 220-2 and 220-3, etc., wherein the second pin 220-1 may, for example, correspond to the position of the first pin of the floating image display module 10, the second pin 220-2 may, for example, correspond to the position of the fourth pin of the sensing module 30, and the second pin 220-3 may, for example, correspond to the position of the sixth pin of the feedback module 40. The upper assembling surfaces of various modules in the present application may have pins corresponding to the plurality of second pins 220-1, 220-2 and 220-3. In addition, the signal processing module 20 can have a lateral assembling surface 23, and the lateral assembly surface 23 is provided with a lateral pin 230 for lateral connection with other modules. In some embodiments, other modules may also have lateral pins, and different modules may also be laterally connected to transmit signals.

Figure 5A:
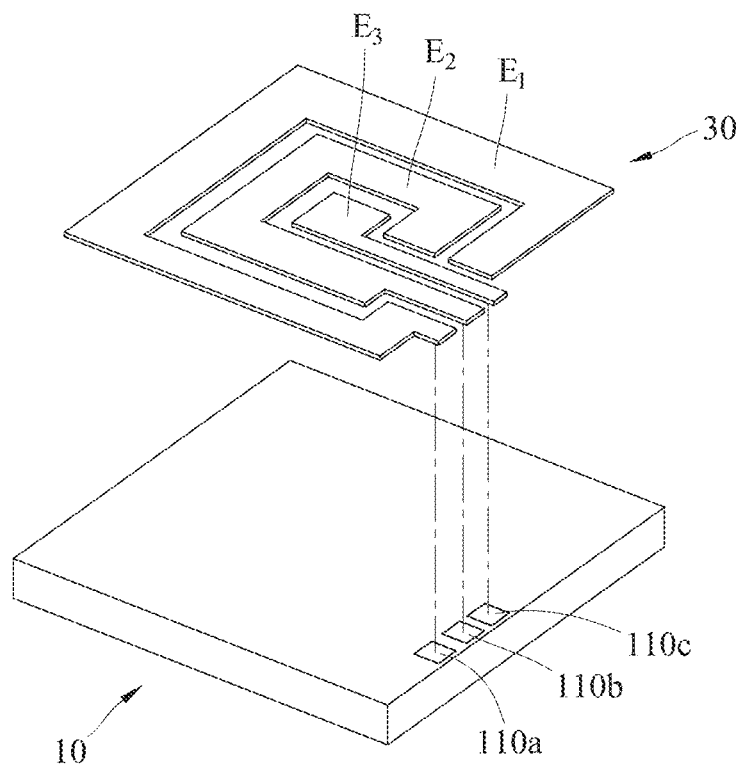
FIG. 5A schematically illustrates an electrode wiring design of a floating image display module according to another embodiment of the present disclosure.
Figure 5B:
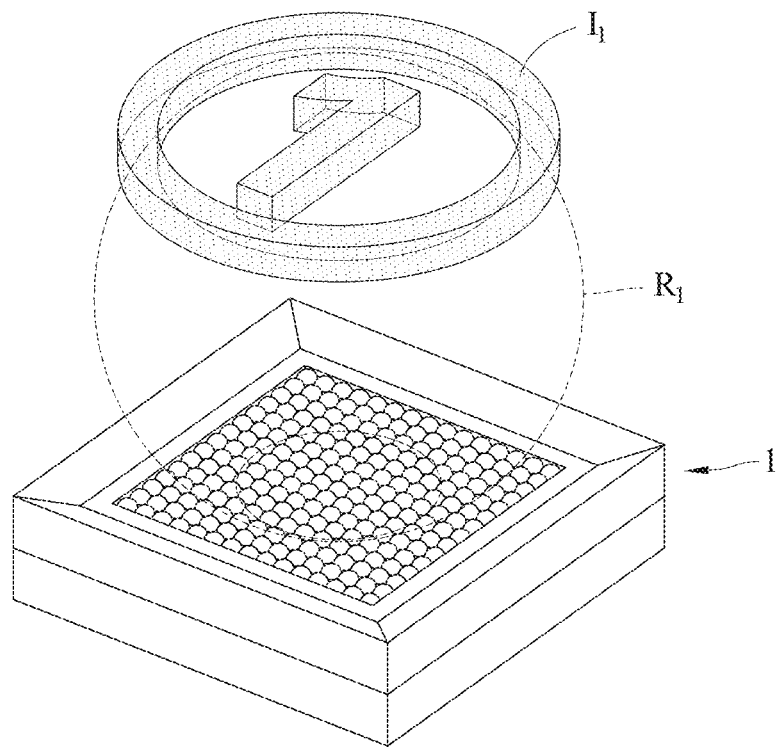
FIGS. 5B to 5D schematically illustrate an image and a detection range of the floating image display module according to FIG. 5A.
Figure 5C:
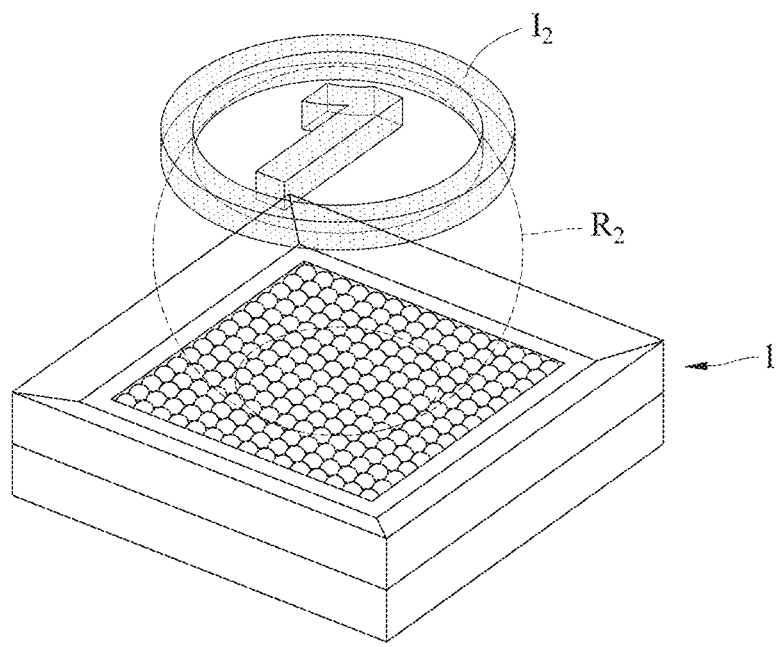
Figure 5D:
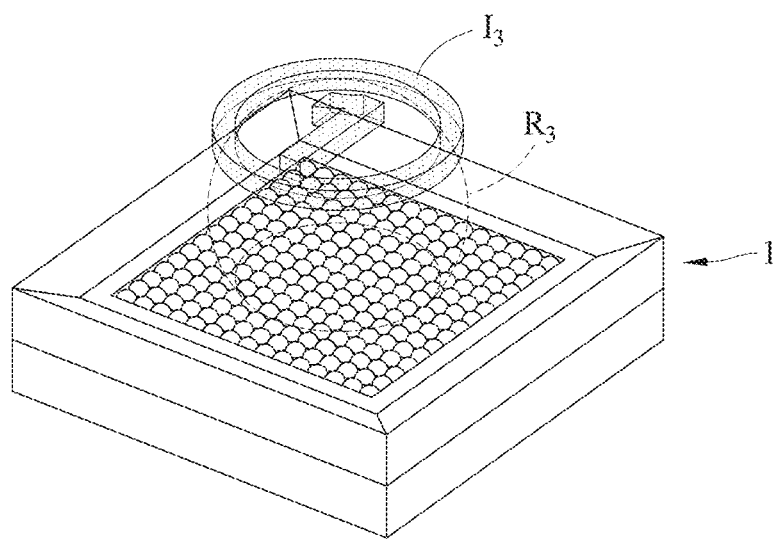

Please refer to FIGS. 5A to 5D. FIG. 5A schematically illustrates an electrode wiring design of a floating image display module according to another embodiment of the present disclosure. FIGS. 5B to 5D schematically illustrate an image and a detection range of the floating image display module according to FIG. 5A. As shown in FIGS. 5A to 5D, the floating image display module 10 may have, for example, a plurality of first pins 110a, 110b, and 110c corresponding to different floating image display ranges. For example, the floating image display device 1 can correspond to the floating image $I_1$ with the largest display range by turning on the first pin 110a, can correspond to the floating image $I_2$ with the second largest display range by turning on the first pin 110*b*, and can correspond to the floating image $I_3$ with the smallest display range by turning on the first pin 110*c*. The floating image display device 1 in the present embodiment may be the same as various embodiments of the floating image display device mentioned above. When the signal processing module receives an external command to change the image size, the signal processing module can be connected to the electrical signal transmission path of one of the first pins 110*a*, 110*b*, and 110*c*, so as to transmit the display signal to the floating image display module through the electrical signal transmission path. Corresponding to the floating images of different sizes mentioned above, the sensing module 30 can switch between various sensing ranges through the graphic design of the internal sensing electrode wiring and the selection of the contact position. For example, as shown in FIG. 5B, the electrode $E_1$ with the largest area may correspond to the largest sensing range $R_1$; as shown in FIG. 5C, the electrode $E_2$ with the second largest area may correspond to the second largest sensing range $R_2$; as shown in FIG. 5D, the electrode $E_3$ with the smallest area may correspond to the smallest sensing range $R_3$. The sensing module 30 of the present embodiment can be the same as the sensing module mentioned above, that is, the plurality of contacts can correspond to the plurality of fourth pins mentioned above. In addition, the above-mentioned sensing electrode wiring can be designed through a multi-layer surrounding pattern, or through multi-layer stacking of electrodes of different sizes, which is not limited in the present disclosure.

Figure 6:
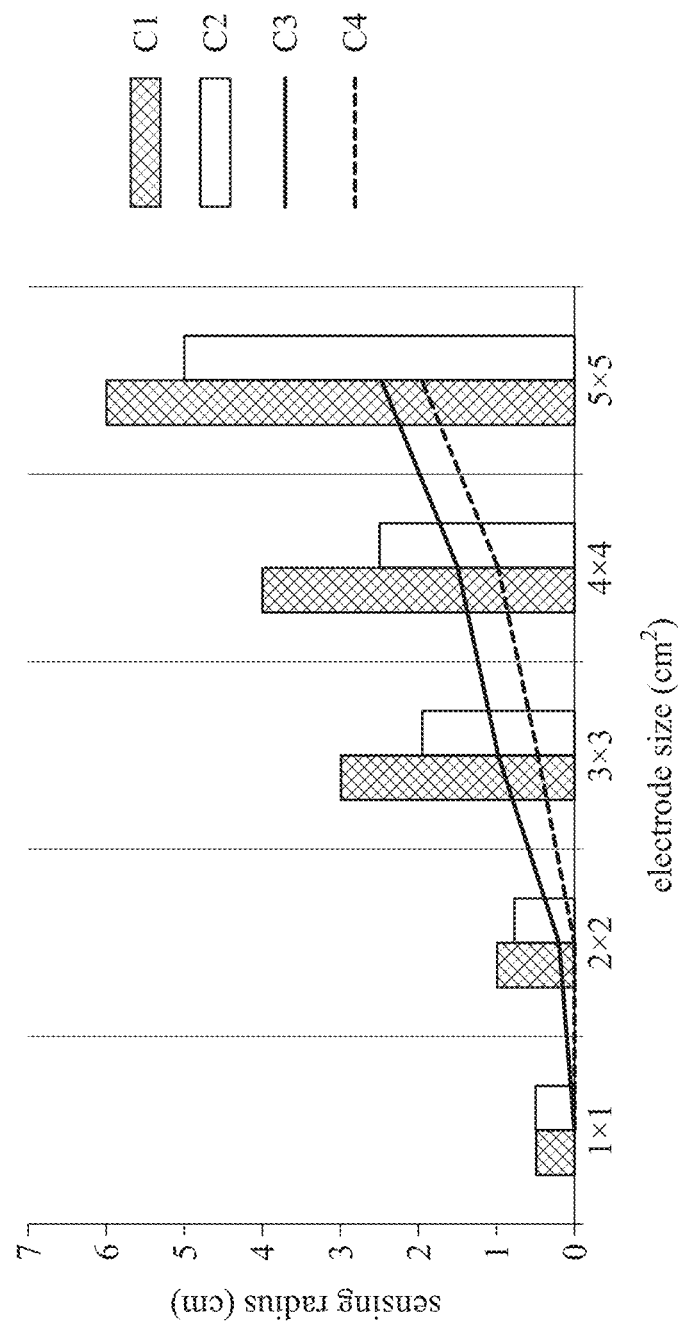
FIG. 6 is a graph illustrating the relationship between the sensing radius and the electrode size of a floating image display device according to another embodiment of the present disclosure.

Please refer to FIG. 6 along with FIGS. 5A to 5D. FIG. 6 is a graph illustrating the relationship between the sensing radius and the electrode size of a floating image display device according to another embodiment of the present disclosure. Data C1 is the thickness of the sensing electrode (along z direction) being 500 angstroms (Å), data C2 is the thickness of the sensing electrode (along z direction) being 100 angstroms (Å), data C3 is the thickness of the sensing electrode (along xy direction) being 500 angstroms (Å), and data C4 is the thickness (along xy direction) of the sensing electrode being 100 angstroms (Å). As shown in the graph, the larger the electrode size, the larger the sensing range; and the larger the thickness of the sensing electrode (along z direction), the larger the sensing range.

Accordingly, the wiring size of the sensing electrodes can be designed according to application requirements, so as to generate different sensing ranges.

The floating image display device mentioned above can be connected to each other through lateral pins to form a large-area floating image display array. An assemblable floating image display array according to an embodiment of the present disclosure includes a plurality of floating image display devices. Each of the plurality of floating image display devices includes a floating image display module and a signal processing module. The floating image display module has a first upper assembling surface and a first lower assembling surface oppositely disposed, and includes a first pin located on the first lower assembling surface. The floating image display module is configured to form floating images. The signal processing module has a second upper assembling surface and a second lower assembling surface oppositely disposed, and a lateral assembling surface, and includes a plurality of second pins located on the second upper assembling surface and at least one lateral pin located on the lateral assembling surface, wherein one of the plurality of second pins is detachably connected to the first pin. The signal processing module is configured to identify the floating image display module according to the position of the first pin corresponding to the plurality of second pins, and transmit the display signal associated with the floating image to the floating image display module through the first pin. Each of the plurality of floating image display devices is laterally connected to each other through the at least one lateral pin.

Figure 7:
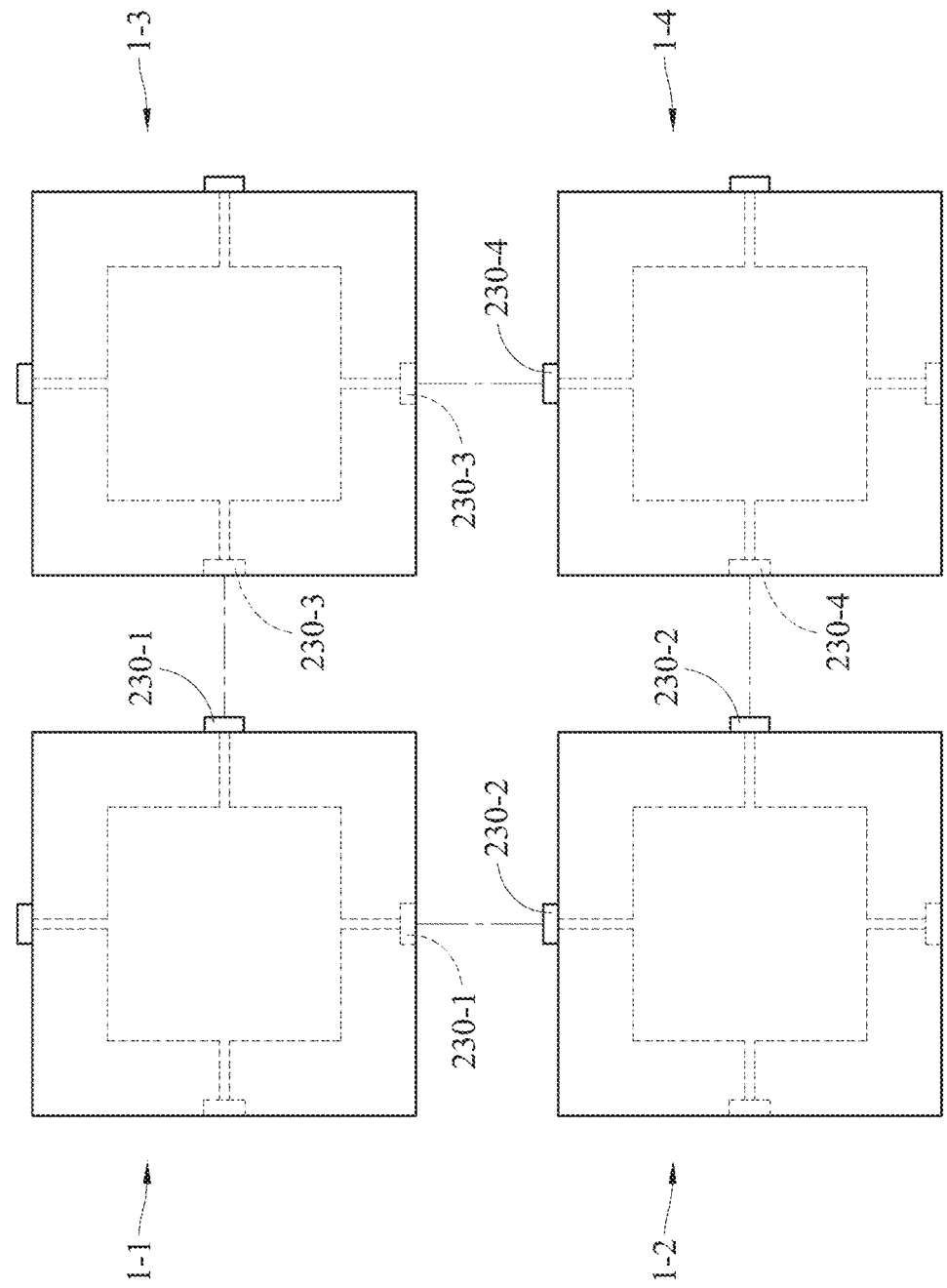
FIG. 7 schematically illustrates an assemblable floating image display array according to an embodiment of the present disclosure.

Please refer to FIG. 7, which schematically illustrates an assemblable floating image display array according to an embodiment of the present disclosure. As shown in FIG. 7, a plurality of floating image display devices 1-1, 1-2, 1-3 and 1-4 are laterally connected to each other through lateral pins. For example, the floating image display devices 1-1 and 1-2 can be connected to each other through the lateral pin 230-1 (receptacle) and the lateral pin 230-2 (plug), the floating image display devices 1-2 and 1-4 can be connected to each other through the lateral pin 230-2 (plug) and the lateral pin 230-4 (receptacle), the floating image display devices 1-4 and 1-3 can be connected to each other through the lateral pin 230-4 (plug) and the lateral pin 230-3 (receptacle), and the floating image display devices 1-3 and 1-1 can be connected to each other through the lateral pin 230-3 (receptacle) and the lateral pin 230-1 (plug). In the present embodiment, the lateral pins are set on the signal processing module, but in some embodiments, the lateral pins can also be set on other modules (such as floating image display module, sensing module and/or feedback module), and the present disclosure is not limited to this.

Furthermore, when adjacent floating image display devices are connected through lateral pins, they can transmit positioning signals to each other. That is, taking the splicing structure shown in FIG. 7 as an example, multiple floating image display devices can be coordinatized according to the positioning signal. When the system inputs an entire image signal to the floating image display array, each floating image display device can obtain a partial image signal according to its coordinate information, and display the partial image separately, so that multiple partial images can be spliced into an entire image. Alternatively, a plurality of floating image display devices can also be installed on the system motherboard (not shown), and the coordinates of the devices can be defined according to the installed positions. In addition, the floating image display array with the sensing module can also perform touch positioning operation according to the positioning signal. For example, the floating image display array can include multiple floating image buttons. When user touches different buttons, the user's touch control information can be integrated among the multiple floating image display devices to complete a multi-step touch control operation process.

Figure 8A:
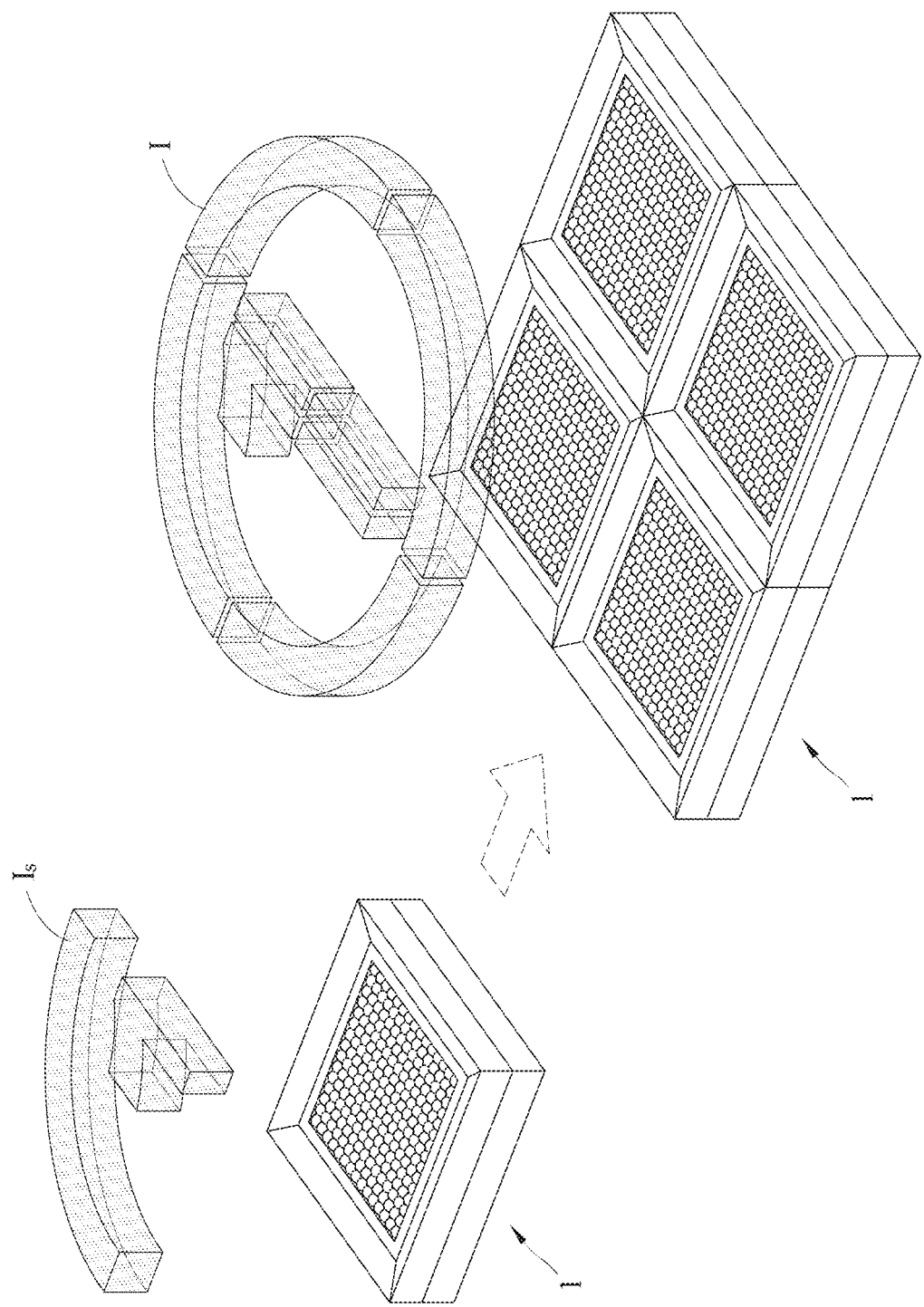
FIG. 8A schematically illustrates single-mode splicing of an assemblable floating image display array according to an embodiment of the present disclosure.
Figure 8B:
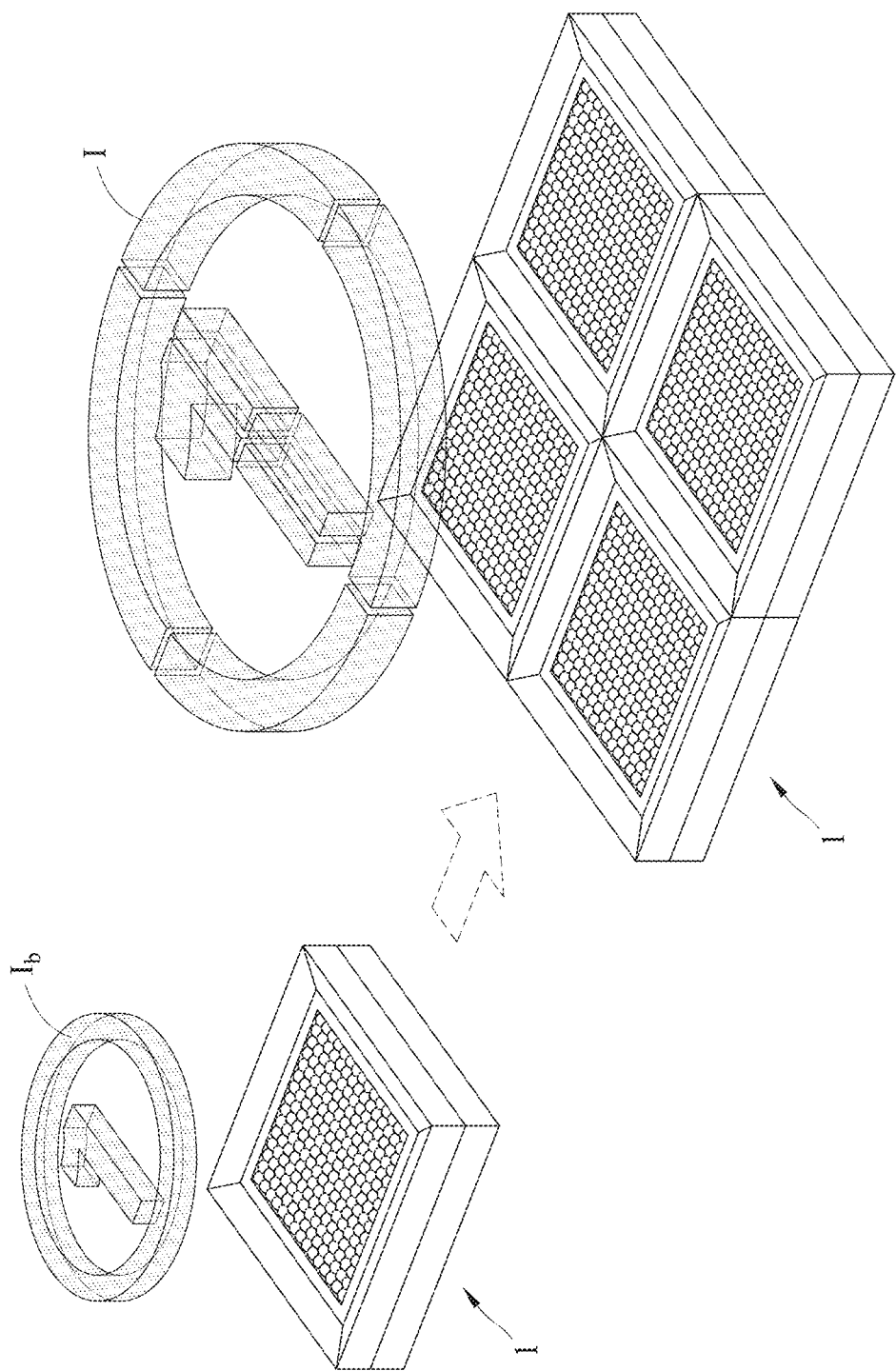
FIG. 8B schematically illustrates double-mode splicing of an assemblable floating image display array according to an embodiment of the present disclosure.

Please refer to FIGS. 8A and 8B. FIG. 8A schematically illustrates single-mode splicing of an assemblable floating image display array according to an embodiment of the present disclosure. FIG. 8B schematically illustrates double-mode splicing of an assemblable floating image display array according to an embodiment of the present disclosure. The image splicing of the floating image display array in the present embodiment may include single-mode splicing and double-mode splicing. Taking the single-mode splicing shown in FIG. 8A as an example, each floating image display device 1 displaying a partial image Is can generate an entire image I through lateral splicing. Taking the double-mode splicing shown in FIG. 8B as an example, each floating image display device 1 displaying a complete image $I_b$ can generate an entire image I by updating its respective projection signals through lateral splicing. In one implementation, the lateral pin of the floating image display device can switch the power input position by means of mechanism buckle, for example, when the module is not yet connected laterally, the initial screen (A) of the module is on, and when the mechanism is connected laterally, the screen (A) is off and the screen (B) is on. Alternatively, the floating image display device can use a logic circuit to determine whether the lateral pins are connected, and switch circuits after connection to display different floating images.

Figure 9:
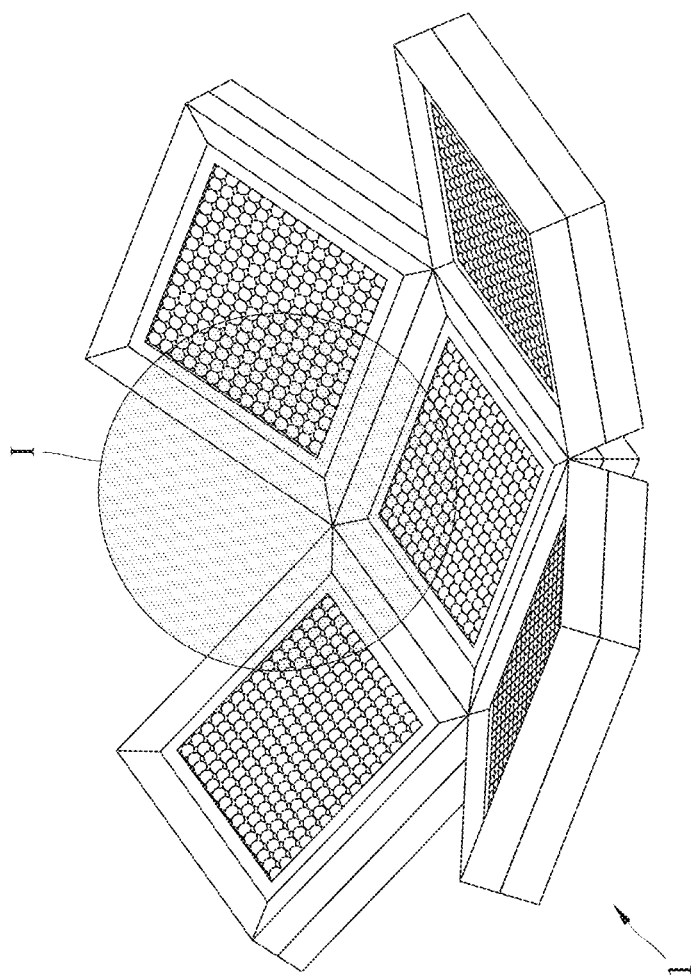
FIGS. 9, 10A and 10B schematically illustrate image splicing of an assemblable floating image display array according to another embodiment of the present disclosure.
Figure 9:
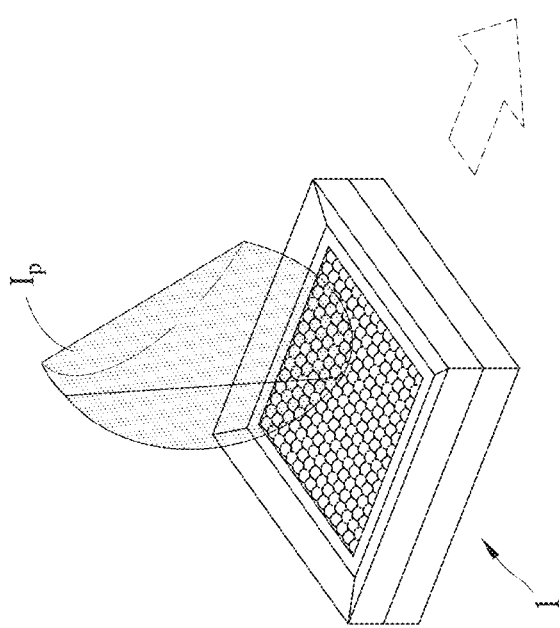
Figure 10A:
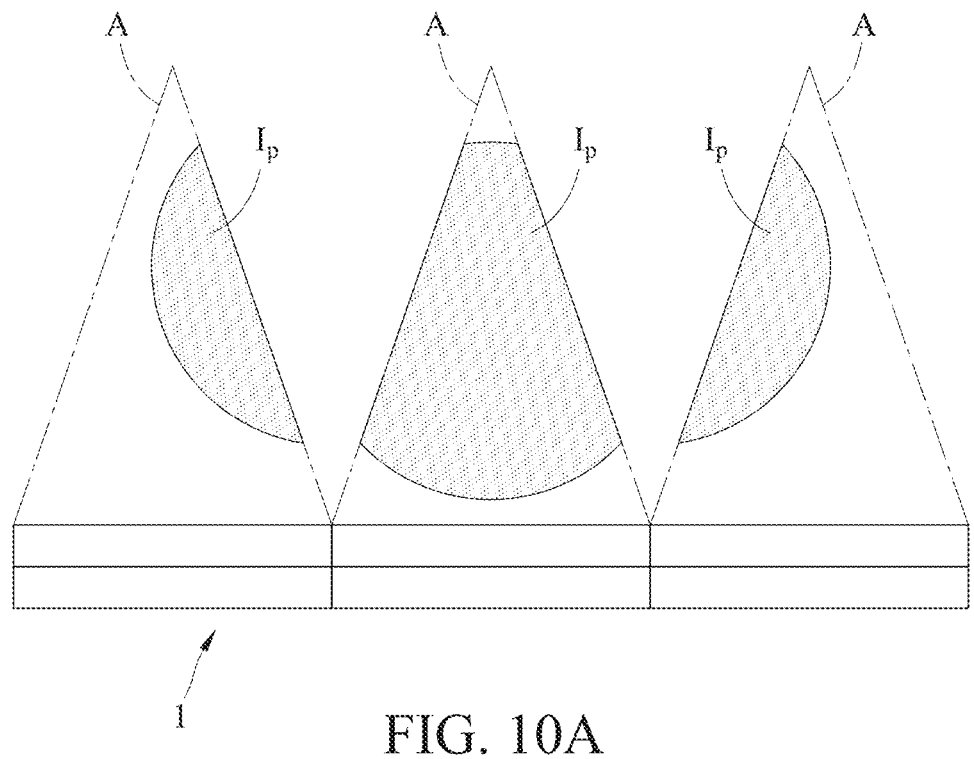
Figure 10B:
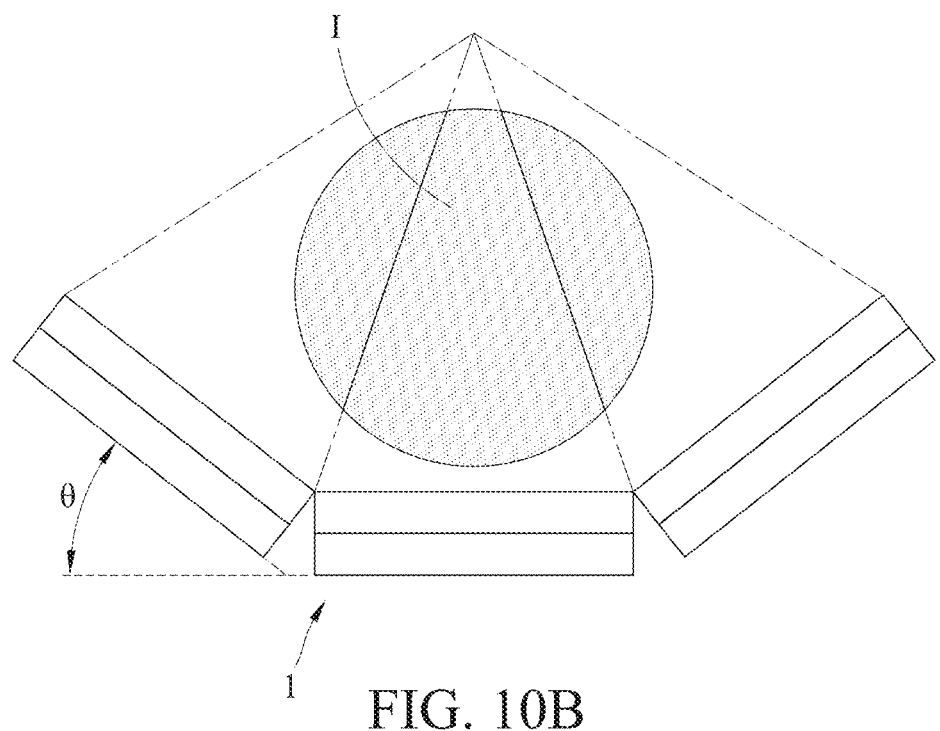

Please refer to FIGS. 9, 10A and 10B, which schematically illustrate image splicing of an assemblable floating image display array according to another embodiment of the present disclosure. As shown in FIG. 9, a plurality of floating image display devices 1 forming a floating image display array can jointly form a floating image I, wherein the surrounding floating image display devices 1 can be bent at a specific angle toward the central floating image display device, so that the gaps between the multiple partial images forming the floating image I are effectively reduced. As shown in FIGS. 10A and 10B, each floating image display device 1 has its own display area A and forms a partial image $I_p$. By adjusting the angle θ between the lower assembling surfaces of adjacent floating image display devices, the floating image I can be formed more completely. In addition, the field of view (FOV) of the floating image I is also related to the angle θ. For example, by reducing the angle θ, the height of the floating image is higher and the range is larger; by increasing the angle θ, the height of the floating image is lower and the range is smaller. In the present embodiment, the lateral assembling surface of the floating image display device may have hinges, rotating shafts, or adjustable bases, etc., and is rotatably connected to adjacent modules. In addition, the frame of the module can be other than a quadrilateral, for example, it can be designed as a polygon such as a triangle or a hexagon.

Figure 11:
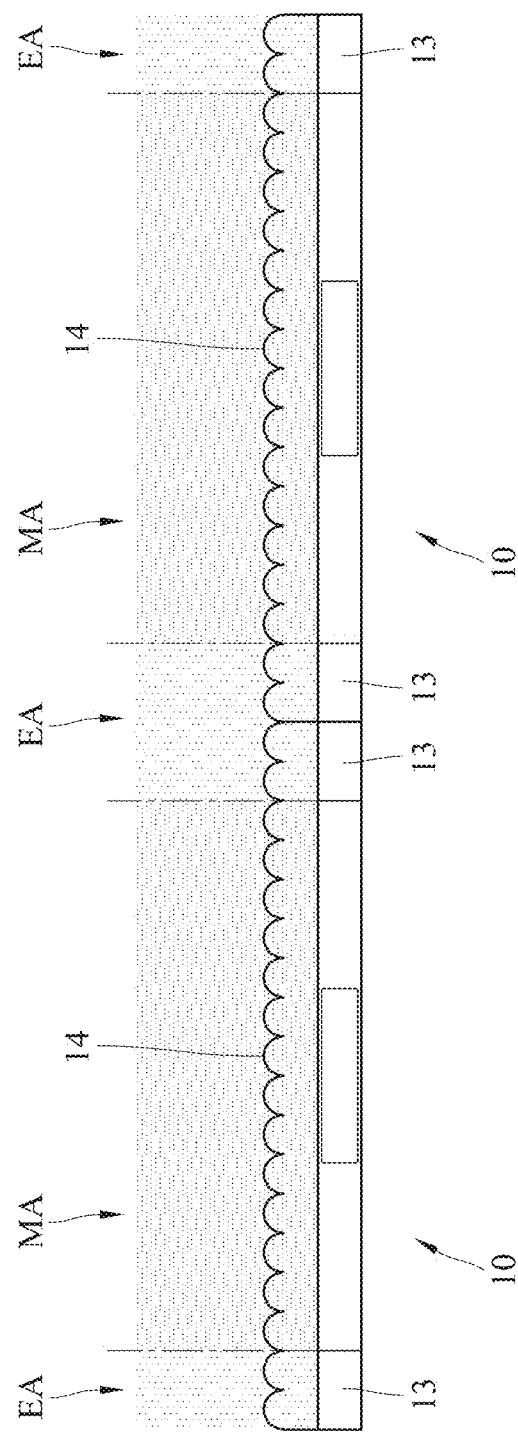
FIG. 11 schematically illustrates image splicing of an assemblable floating image display array according to still another embodiment of the present disclosure.

Please refer to FIG. 11, which schematically illustrates image splicing of an assemblable floating image display array according to still another embodiment of the present disclosure. In some embodiments, the edge invalid area of the floating image display module can also be filled by adding an edge light guide area at the edge of the floating image display module. As shown in FIG. 11, the floating image display module 10 has main image projection areas MA, and there may be gaps between the main image projection areas MA of adjacent floating image display modules 10. By disposing the edge light guide area 13 at the edge of the lens array 14, the edge invalid area EA can be filled with bright lines or dark lines according to the screen requirements. The edge light guide area 13 can be implemented by using light emitting diodes (LEDs), for example.

In view of the above description, the floating image display device and assemblable floating image display array of the present disclosure can make floating image display to be used in more diverse environments through an integrated modular package, and can replace different functional modules flexibly depending on the field requirements, with degree of freedom in designing the devices to be flexibly connected to meet various requirements in fields. The modular floating image display device and assemblable floating image display array can be adapted to various human-machine systems to achieve the effect of quick replacement. There may also be a connection port between the floating image display devices that can be assembled, and multiple floating image display devices can be connected in series to achieve a large-size display. In addition, through the design of the rotatable angle between the floating image display devices, or setting the edge light guide area at the edge of the lens array, the splicing effect of the floating image can be optimized.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A floating image display device, comprising:
   a floating image display module having a first upper assembling surface and a first lower assembling surface oppositely disposed, and comprising a first pin located on the first lower assembling surface, and configured to form a floating image; and
   a signal processing module having a second upper assembling surface and a second lower assembling surface oppositely disposed, and comprising a plurality of second pins located on the second upper assembling surface, wherein one of the plurality of second pins is detachably connected to the first pin, and the signal processing module is configured to identify the floating image display module according to a position of the first pin corresponding to the plurality of second pins, and transmit a display signal associated with the floating image to the floating image display module through the first pin.

2. The floating image display device of claim 1, wherein the floating image display module further comprises a plurality of third pins located on the first upper assembling surface, the plurality of third pins respectively correspond to the plurality of second pins, and the floating image display device further comprises:
   a first functional module having a third upper assembling surface and a third lower assembling surface oppositely disposed, and comprising a fourth pin located on the third lower assembling surface, wherein the fourth pin is detachably connected to one of the plurality of third pins, and the signal processing module is further configured to identify the first functional module according to a position of the fourth pin corresponding to the plurality of second pins.

3. The floating image display device of claim 2, wherein the first functional module is a sensing module, the sensing module is configured to sense whether there is a testing object within a range corresponding to the floating image and generate a sensing signal, and the signal processing module is further configured to receive the sensing signal through the fourth pin and the first pin and update and transmit the display signal to the floating image display module when the sensing signal indicates that the testing object is within the range.

4. The floating image display device of claim 2, wherein the first functional module further comprises a plurality of fifth pins located on the third upper assembling surface, the plurality of fifth pins respectively correspond to the plurality of second pins, and the floating image display device further comprises:
   a second functional module having a fourth upper assembling surface and a fourth lower assembling surface oppositely disposed, and comprising a sixth pin located on the fourth lower assembling surface, wherein the fourth lower assembling surface is detachably combined with the third upper assembling surface, the sixth pin is connected to one of the plurality of fifth pins, and the signal processing module is further configured to identify the second functional module according to a position of the sixth pin corresponding to the plurality of second pins, wherein the first functional module is one of a sensing module and a feedback module, and the second functional module is the other one of the sensing module and the feedback module, and the sensing module is configured to sense whether there is a testing object within a range corresponding to the floating image and generate a sensing signal, and the signal processing module is further configured to receive the sensing signal to update and transmit the display signal to the floating image display module and/or to generate and transmit a feedback signal to the feedback module, and the feedback module is configured to give feedback to the testing object according to the feedback signal.

5. The floating image display device of claim 1, further comprising:

a first functional module having a third upper assembling surface and a third lower assembling surface oppositely disposed, and comprising a fourth pin located on the third lower assembling surface and a plurality of fifth pins located on the third upper assembling surface, wherein the fourth pin is detachably connected to one of the plurality of second pins, and the plurality of fifth pins respectively correspond to the plurality of second pins, wherein the first pin is detachably connected to one of the plurality of fifth pins, and the signal processing module is further configured to identify the first functional module according to a position of the fourth pin corresponding to the plurality of second pins.

6. The floating image display device of claim 5, wherein the first functional module is a sensing module, the sensing module is configured to sense whether there is a testing object within a range corresponding to the floating image and generate a sensing signal, and the signal processing module is further configured to receive the sensing signal through the fourth pin and the first pin and update and transmit the display signal to the floating image display module when the sensing signal indicates that the testing object is within the range.

7. The floating image display device of claim 5, wherein the floating image display module further comprises a plurality of third pins located on the first upper assembling surface, the plurality of third pins respectively correspond to the plurality of second pins, and the floating image display device further comprises:

a second functional module having a fourth upper assembling surface and a fourth lower assembling surface oppositely disposed, and comprising a sixth pin located on the fourth lower assembling surface, wherein the sixth pin is detachably connected to one of the plurality of third pins, and the signal processing module is further configured to identify the second functional module according to a position of the sixth pin corresponding to the plurality of second pins.

8. The floating image display device of claim 7, wherein the first functional module is one of a sensing module and a feedback module, and the second functional module is the other one of the sensing module and the feedback module, and the sensing module is configured to sense whether there is a testing object within a range corresponding to the floating image and generate a sensing signal, and the signal processing module is further configured to receive the sensing signal to update and transmit the display signal to the floating image display module and/or to generate and transmit a feedback signal to the feedback module, and the feedback module is configured to give feedback to the testing object according to the feedback signal.

9. The floating image display device of claim 1, wherein the floating image display module has a plurality of first pins corresponding to a plurality of display ranges respectively, and the signal processing module is further configured to receive an external command to be connected to an electrical signal transmission path of one of the plurality of first pins accordingly, so as to transmit the display signal to the floating image display module through the electric signal transmission path.

10. The floating image display device of claim 9, further comprising a sensing module, wherein a plurality of sensing electrodes inside the sensing module have different pattern wiring designs, a plurality of contacts of the plurality of sensing electrodes correspond to the plurality of first pins respectively, and a plurality of sensing ranges of the plurality of sensing electrodes respectively correspond to the plurality of display ranges.

11. An assemblable floating image display array, comprising a plurality of floating image display devices, wherein each of the plurality of floating image display devices comprises:

a floating image display module having a first upper assembling surface and a first lower assembling surface oppositely disposed, and comprising a first pin located on the first lower assembling surface, and the floating image display module configured to form a floating image; and a signal processing module having a second upper assembling surface and a second lower assembling surface oppositely disposed, and a lateral assembling surface, and comprising a plurality of second pins located on the second upper assembling surface and at least one lateral pin located on the lateral assembling surface, wherein one of the plurality of second pins is detachably connected to the first pin, and the signal processing module is configured to identify the floating image display module according to a position of the first pin corresponding to the plurality of second pins, and transmit a display signal associated with the floating image to the floating image display module through the first pin, wherein each of the plurality of floating image display devices is laterally connected to each other through the at least one lateral pin.

12. The assemblable floating image display array of claim 11, wherein at least one of the plurality of floating image display devices further comprises:

a sensing module having a third upper assembling surface and a third lower assembling surface oppositely disposed, and comprising a fourth pin located on the third lower assembling surface and a plurality of fifth pins located on the third upper assembling surface, wherein the sensing module is configured to sense whether there is a testing object within a range corresponding to the floating image and generate a sensing signal, and the signal processing module is further configured to receive the sensing signal and update and transmit the display signal to the floating image display module when the sensing signal indicates that the testing object is within the range.

13. The assemblable floating image display array of claim 12, wherein at least one of the plurality of floating image display devices further comprises:

a feedback module having a fourth upper assembling surface and a fourth lower assembling surface oppositely disposed, and comprising a sixth pin located on the fourth lower assembling surface and a plurality of seventh pins located on the fourth upper assembling surface, wherein the signal processing module is further configured to receive the sensing signal to update and transmit the display signal to the floating image display module and/or to generate and transmit a feedback signal to the feedback module, and the feedback module is configured to give feedback to the testing object according to the feedback signal.

14. The assemblable floating image display array of claim 11, wherein the at least one lateral pin of each of the plurality of floating image display devices comprises two lateral plug pins and two lateral receptacle pins.

15. The assemblable floating image display array of claim 11, wherein when a first one of the plurality of floating image display devices is connected to a second one of the plurality of floating image display devices through the at least one lateral pin, the signal processing module of the first one transmits a positioning signal to the signal processing module of the second one through the at least one lateral pin, and the display signal is associated with the positioning signal.

16. The assemblable floating image display array of claim 11, wherein when a first one of the plurality of floating image display devices is connected to a second one of the plurality of floating image display devices through the at least one lateral pin, the signal processing module of the first one and the signal processing module of the second one update the display signal.

17. The assemblable floating image display array of claim 11, wherein when a first one of the plurality of floating image display devices is connected to a second one of the plurality of floating image display devices through the at least one lateral pin, an angle between a first lower assembling surface of the first one and a second lower assembling surface of the second one is adjustable, and a range of the floating image is associated with the angle.

18. The assemblable floating image display array of claim 17, wherein the lateral assembling surface of each of the plurality of floating image display devices further comprises a rotatable connection mechanism with a hinge, a rotating shaft, or an adjustable base.

19. The assemblable floating image display array of claim 11, wherein the signal processing module of each of the plurality of floating image display devices is disposed on a stringing motherboard through the second lower assembling surface, and the signal processing module obtains coordinate information according to a position where the signal processing module is located on the stringing motherboard.

20. The assemblable floating image display array of claim 11, wherein the floating image display module of each of the plurality of floating image display devices has an edge light guide area.

* * * * *